H. PIEPER.
ELECTROMECHANICAL SYSTEM FOR THE PROPULSION OF AUTOMOBILES.
APPLICATION FILED SEPT. 25, 1906.
1,062,551.
Patented May 20, 1913.
2 SHEETS—SHEET 1.
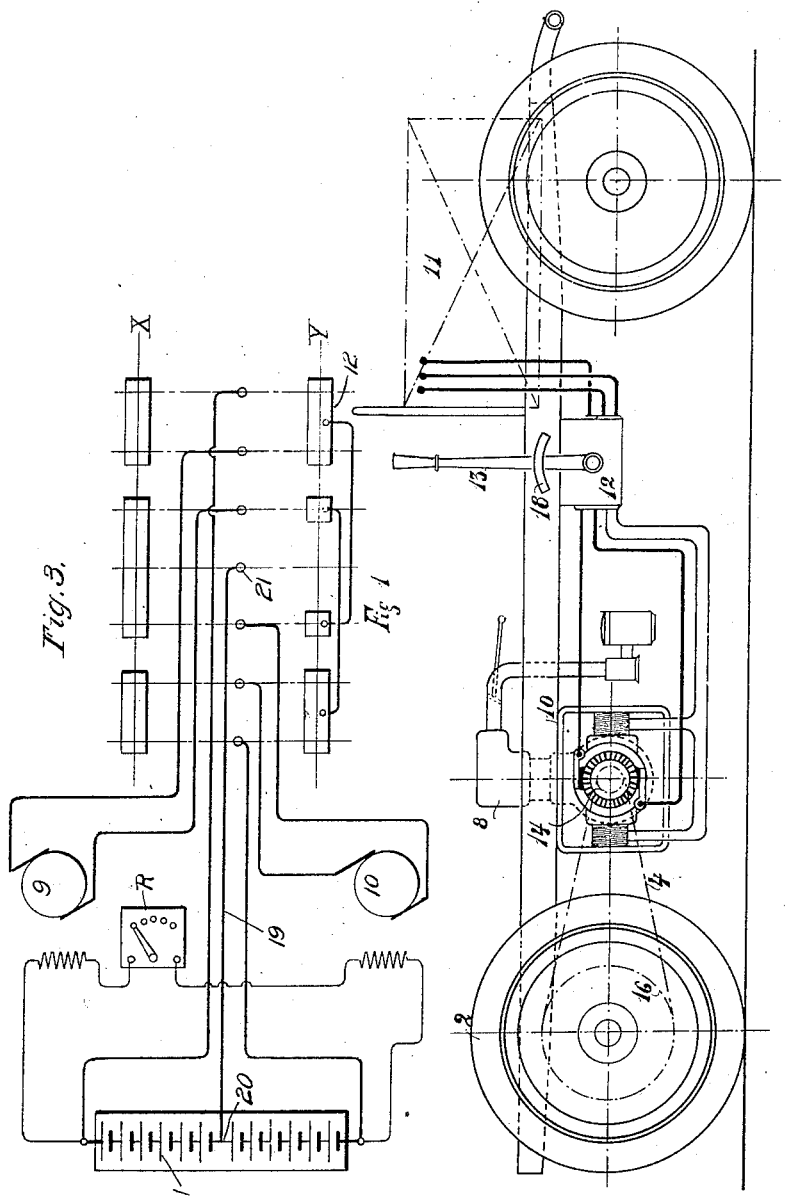

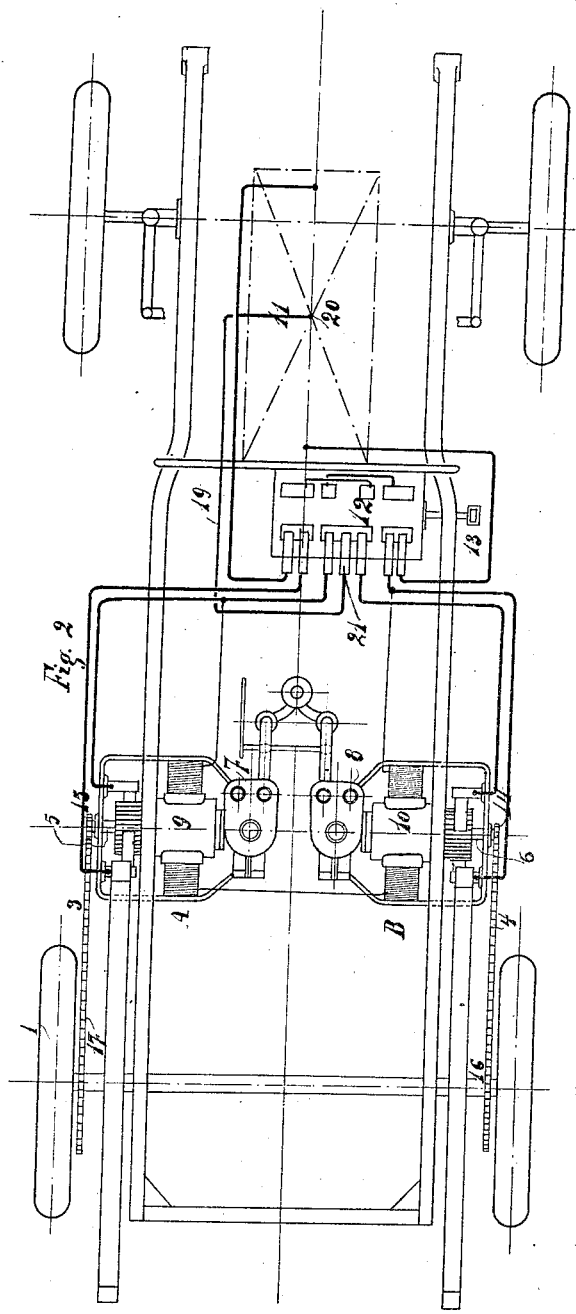

UNITED STATES PATENT OFFICE.

HENRI PIEPER, OF LIEGE, BELGIUM.

ELECTROMECHANICAL SYSTEM FOR THE PROPULSION OF AUTOMOBILES.

1,062,551.    Specification of Letters Patent.    Patented May 20, 1913.

Application filed September 25, 1906.    Serial No. 336,122.

*To all whom it may concern:*

Be it known that I, HENRI PIEPER, subject of the King of Belgium, and residing at Liege, Belgium, have invented certain new and useful Improvements in Electromechanical Systems for the Propulsion of Automobiles; and I do hereby declare the following to be a full, clear, and exact description of the invention, such as will enable others skilled in the art to which it appertains to make and use the same.

The propulsion of automobiles is usually effected either by steam motors, or by internal-combustion motors using petrol, benzin or like fuel; or by electro-motors supplied with current from a battery of accumulators carried on the vehicle, but recently a combination or mixed system of electro-mechanical propulsion has been adopted, in which, in addition to an explosion motor, the vehicle is provided with an electric motor and generally also with a battery of accumulators. Automobiles having this system of propulsion may be classified broadly into two categories: viz:—One, in which all the energy furnished by the engine is transformed into electricity, for driving electric motors which are, in turn, coupled to the driving wheels of the vehicle, and another in which the engine is arranged to drive the wheels of the vehicle and is also connected with a dynamo-electric machine working in parallel with a set of accumulators so that when the vehicle is running downhill or under easy conditions, the dynamo is run as a generator and its current is utilized to charge the accumulators and store up energy, but when hill-climbing or running under other unfavorable conditions the accumulators discharge the said energy in current which drives the dynamo as a motor and the latter then assists the explosion engine in the propulsion of the vehicle. This method has the advantage, among others, that the motor need only be designed to give out a mean power, without being liable to stop in the event of overload.

The present invention relates to this last-described electro-mechanical system.
Up to the present, there has only been employed, in both the classes of combined systems, a single explosion motor for the vehicle, and, indeed, it may be observed that, with regard to the first mentioned system,
no special advantage is to be attained by the employment of a second motor, but with regard to the second class, the employment of two or more electro-mechanical groups or combinations each consisting of an explosion motor coupled to a dynamo, has numerous advantages over the single group usually employed. All the advantages, however, which are to be derived from a purely mechanical system of propulsion together with those obtainable from a purely electrical system, are combined in the improved combination system. Thus, in the first class, owing to the transformation of the total energy into electrical energy, the differential gear in the transmission system of the vehicle is dispensed with, while by connecting the electro-motors in series or in parallel, the speed can be easily regulated between the widest limits; but on the other hand, the excessive weight of installation is a very serious disadvantage, while, in the case of a combined system of the second class (in which up to the present, only a single motor group has been employed), although the weight is very considerably reduced, it is still essential to provide the transmission mechanism with a differential gear which introduces certain complications into the system and also causes loss of power, and the method of propulsion is moreover, inferior to the first class with respect to the regulation of the speed.

The object of the present invention is to overcome the disadvantages which have been heretofore experienced in combined systems of propulsion.

The invention consists in the employment of two or more electro-mechanical groups so arranged that each of the driving wheels of the vehicle is driven and controlled by a separate group. This may be effected without the weights of the full installation exceeding the supportable limit. The differential gear is then dispensed with, while the regulation of the speed can be effected either by varying the excitation current, or by connecting the electrical elements of the groups in parallel or in series.

The number of the electro-mechanical groups employed in each vehicle is equal to the number of wheels to be driven, at least two being employed. The accompanying drawings represent by way of example, the application of the system to an automobile in which the rear wheels are independently driven by two such groups.

Figure 1 shows in elevation and Fig. 2 in plan, a chassis equipped in this manner. Fig. 3 is a diagram of electrical connections.

The driving wheels 1 and 2 of the vehicle receive their motion from chains 3 and 4, driven directly by the axles 5 and 6 of the electro-mechanical groups A and B which each comprise, essentially, an explosion motor (7, 8) coupled to a dynamo electric machine (9, 10). The system also includes a battery of accumulators 11 and a controller 12, which, by the manipulation of the lever 13, effects the required couplings and connections. In the case of heavy vehicles all four vehicle wheels can be driving wheels, and each of them controlled by a separate electro-mechanical group.

The battery 11 is, at the start, normally charged, and the operation or working of the system is as follows: At the moment of starting, the dynamos 9 and 10 are connected in series; the current from the accumulators is then switched on by means of the controller 12 by moving it to position X, Fig. 3, and the dynamos are run as motors and their effort propels the vehicle electrically. The explosion motors 7 and 8 are then started and their power supplements that of the electric motors. The gear-ratios of the chain pinions 14, 15, 16 and 17 are so fixed as to enable the power of the explosion motors to be sufficient, when starting, to propel the vehicle, and the speed is sufficiently high so that the voltage of the current generated by the dynamos is greater than that of the accumulator to permit charging of the same. Then when the vehicle wheel is running, the speed which may be attained depends upon the electrical conditions under which the dynamos, in parallel with the battery, are worked, and to provide for the speed regulation by this method, the two dynamos 9 and 10 can be coupled either in series by moving controller 12 to position X, or in parallel, by moving controller 12 to position Y, and also their excitation may be varied by diminishing their inductive ampere-turns, as by means of a rheostat R or in any other suitable manner known to those skilled in the art. Thus when the vehicle is running under normal conditions, the explosion motors drive the vehicle and also run the dynamos as generators, and the battery is kept charged by the current generated, which varies, however, according to the different conditions of speed. But when the vehicle is driven up rising ground, the speed diminishes, the dynamos 9 and 10 of the groups are then driven as motors by the current from the battery 11, and add their power to that of the explosion motors 7 and 8. On the other hand, when the vehicle is running on descending ground, all the power developed by the engines in excess of that required for propelling the vehicle is transformed into electricity by utilizing the same to run the dynamos as generators and re-charge the accumulators. It will thus be understood that the effect of the alternately charging and discharging current is to equalize the speed of the vehicle and render the running regular and even over the varying gradients of a road.

The lever 13, which alters the dynamo connections of the system, is provided with means for engaging in one or other of a series of notches formed in quadrant-plate 18 or the like, and corresponding to the several speeds which can be obtained by the system according to the position in which the lever is placed.

The improved system also admits of the excess power which is generated by the running of the vehicle being stored or accumulated as energy when the controlling lever 13 is moved into a position corresponding to a lower speed than that which it previously occupied. The reverse drive of the vehicle has in every case to be effected electrically by means of an ordinary reversing switch on the controller and using the current of the battery to run the dynamos as motors, inasmuch as the motors 7 and 8 cannot turn in the reverse direction without special gearing.

Where electro-mechanical units, each comprising a thermal motor and a dynamo connected thereto, are independently connected to drive the driving wheels of a motor vehicle, it is practically impossible to start the two dynamos as motors simultaneously for the following reasons: The thermal motors, especially where they are as in this case internal combustion engines, do not offer the same resistance at the same time, since one of the engines may be at the period of compression and the other at the period of suction or exhaust. On the other hand one of the driving wheels may offer less resistance than the other, since it may be raised off of the ground or in soft earth. The driving member and its engine and dynamo, which offer the least resistance, will start alone and thus accelerate their speed. If now the dynamos are connected in series, and the starting switch is thrown to start the dynamos as motors from the storage battery, it will be found that the unit which offers the least resistance to starting will accelerate, while the other unit will remain stationary. As the first motor increases its speed, its counter-electromotive force will increase with the speed thus cutting down the current traversing the motor and also the second motor which is stationary, thus decreasing the torque of the latter. This will continue until the engine of the first unit starts, when the dynamo connected thereto will be converted into a generator and deliver current to the accumulator as soon as its electromotive force rises above that of the accumulator. The current is now flowing in a reverse direction, and since it flows through the armature of the second dynamo, it may cause it to rotate in a reverse direction, since the excitation of the second dynamo has not been changed. In order to prevent such an operation, means are provided for insuring the independent electrical operation of the units. An equalizing connection 19 connects an intermediate point 20 of the accumulator with the junctions of the dynamos. As shown in the drawings, this equalizing connection runs from the intermediate point of the accumulator to a series contact 21 on the controller 12. By means of this construction the voltage of the accumulator is equally impressed on the two dynamos connected in series, and thus it will be insured that each dynamo when acting as a motor has impressed on it a voltage which is not affected by the counter-electromotive force of the other dynamo when acting as a motor, or its electromotive force when acting as a dynamo. In this way it is insured that both units will start in the proper direction, without danger of reversal of one.

Having fully described my invention, what I desire to claim and secure by Letters Patent is:

1. In an electro-mechanical propulsion means for vehicles, the combination with independently rotatable co-axial driving wheels on the opposite sides of a vehicle, of a plurality of electro-mechanical units each comprising a thermal motor and an electric machine mechanically connected, means for mechanically connecting the electric machine and thermal motor of each unit with a driving wheel, each of the electric machines being capable of operating either as a generator or as a motor and being arranged to drive the wheel connected thereto independently of the other wheel and unit, an accumulator, and means including electric connections between the electric machines and the accumulator and a controller adapted to connect the electric machines in series or in parallel with one another and the accumulator.

2. In an electro-mechanical propulsion means for vehicles, the combination with independently rotatable driving wheels, of a plurality of electro-mechanical units each comprising a thermal motor mechanically connected to an electric machine, means for mechanically connecting each unit with a driving wheel independently of the other wheel and unit, an accumulator, and means for electrically connecting the electric machine with the accumulator and for insuring the independent electrical operation of said machines arranged to prevent one machine from reversing the other, each electric machine being capable of operating either as a generator or as a motor.

3. In an electro-mechanical propulsion means for vehicles, the combination with the independently rotatable driving members of the vehicle, of a plurality of units each including a dynamo, means mechanically connecting each unit with a driving member, independently of the other member and unit, an accumulator, means for connecting said dynamos in series to said accumulator, and an electrical connection from the junction of said dynamos to an intermediate point on the accumulator.

4. In an electro-mechanical propulsion means for vehicles, the combination with the independently rotatable driving members of the vehicle, of a plurality of electro-mechanical units, each comprising a thermal motor and a dynamo mechanically connected, means mechanically connecting each unit with a driving member, independently of the other member and unit, an accumulator, means electrically connecting the dynamos in series, and means for electrically connecting a portion of the accumulator between the terminals of one dynamo and another portion thereof between the terminals of another dynamo, said dynamos being capable of operating either as generators or motors.

5. In an electro-mechanical propulsion means for vehicles, the combination with the independently rotatable driving members of the vehicle, of a plurality of electro-mechanical units, each comprising a thermal motor and a dynamo mechanically connected, means mechanically connecting each unit with a driving member, independently of the other member and unit, an accumulator, means for connecting said dynamos in series between the terminals of the accumulator, and means connecting an intermediate point of said accumulator with the junction of said dynamos, said dynamos being capable of operating either as generators or motors.

6. The combination of the road wheels of a vehicle, including a pair of independently rotatable co-axial driving wheels, a frame carried by the road wheels, separate electro-mechanical units carried by the frame, each unit comprising a thermal motor and an electric machine mechanically connected, means for mechanically connecting the electric machine and the thermal motor of each unit with a driving wheel, each of the electric machines being capable of operating either as a generator or as a motor and being arranged to drive the wheel connected thereto independently of the other wheel and unit, an accumulator supported on the frame, and a controller and electrical connections between the electric machines and the accumulator adapted to connect the electric machines in series and parallel with one another and the accumulator and arranged to prevent one unit from reversing the other.

In testimony whereof I have signed my name to this specification in the presence of two subscribing witnesses.

HENRI PIEPER.

Witnesses:
 EMILE HEPTIA,
 LOUIS BERCK.